Patented Apr. 24, 1945

2,374,628

UNITED STATES PATENT OFFICE 2,374,628

PORTLAND CEMENT AND METHOD OF RETARDING THE SETTING RATE THEREOF

Myron A. Swayze, Hudson, N. Y., assignor to Lone Star Cement Corporation, New York, N. Y., a corporation of Maine No Drawing. Application May 14, 1940, Serial No. 335,139

7 Claims. (Cl. 106—92)

This invention relates to Portland and Portland type cements with a retarded setting rate, and to methods of retarding the rate of setting of such cements at elevated temperatures. More particularly, the invention concerns a slow setting cement and method of retarding the setting rate of cements for use in deep oil wells.

In the cementing of oil wells and similar operations, it is usual to mix Portland cement with about 40 to 50% of water, by weight, to introduce this grout or slurry into the well casing, and to pump it to the place where it is desired to harden. This practice can be carried out readily in wells that are not very deep, but in the deeper wells such as those 6,000 to 12,000 feet or more in depth, longer periods of time are required for pumping the grout into position and high temperatures are encountered accelerating the setting of the cement, so that grouts made with ordinary Portland cement frequently become too stiff for pumping and set before they reach their ultimate location.

Ordinary Portland cement when mixed with water to form a paste sets much faster at elevated temperatures than it does at normal temperatures, because at the higher temperatures hydration begins immediately and the paste is stiffened sufficiently to prevent easy deformation in a very short time. This difficulty in pumping ordinary cement grouts is aggravated in oil wells because during the passage of the grout down through an oil well casing and then upward around the lower end of the casing to the position where it is to harden, the grout is required to pass through narrow channels, making pumping virtually impossible if premature stiffening has taken place.

Various Portland cements and means for overcoming these difficulties have been proposed with more or less success. To be entirely satisfactory for use in cementing deep oil wells, however, a cement should have the property when mixed with water of remaining pumpable for long periods of time at elevated temperatures, and should be of sufficient fineness to remain uniformly suspended in the water until the grout has reached its final destination and has started to set. The fineness of the cement has an important effect on the setting rate of the grout, because the finer a cement is ground, the more reactive surface is exposed and the faster is the setting rate of the grout made with the cement. It is particularly difficult, therefore, to provide Portland cements of sufficient fineness to prevent settling out that also have a sufficiently slow setting rate to make practical their use in deep oil wells.

Various retarders have been proposed for admixture with Portland cement to retard the rate of setting of the grout. Some of these retarders, however, have been required in rather large amounts in order to produce a sufficiently slow setting rate, and as a consequence the presence of the retarding agent may have some detrimental effect on the ultimate strength of the hardened cement. Other retarders produce some other objectionable result although delaying substantially the initial setting of the cement.

It is an object of my invention to provide a Portland or Portland type of cement to which only a small proportion of a very effective setting rate retarder has been added, so that a grout made with this cement has a greatly prolonged setting rate and after hardening has a high strength.

Another object of my invention is to retard the setting rate of Portland cement, even though it is ground very fine, by the addition of a small proportion of a dextrin or a starch, or both.

Another object is the provision of Portland cement containing small proportions of dextrin and a starch containing flour whereby the cement has a slow rate of setting at high temperatures, does not settle out when mixed with water and has a high strength after hardening.

A further object is the provision of methods of preparing and using Portland cements having the foregoing properties.

I have found that a dextrin or starch, or both, when added in very small amounts to Portland cements, has an unusually strong retarding effect on the rate of setting of such cements at elevated temperatures up to and even above 200° F. Dextrin is generally considered to be an intermediate product in the hydrolysis of starch to sugars such as dextrose or maltose, and any of the commercial dextrins may be employed in accordance with my invention. The dextrin may be derived, for example, from subjection of various kinds of starch, including corn starch, potato starch, cassava starch and the like to dry heat of the order of 200–250° C., or the dextrin may be prepared by heating various starches with acids or diastase at high or low temperatures. I prefer to employ a dextrin which has a high adhesive power and which does not contain too large a proportion of sugar. For this reason, the dextrins prepared by the action of dry heat are preferable.

The starches that are suitable for purposes of this invention are the soluble starches that form stiff gels with water. Arrowroot starch has been found to be very satisfactory for this purpose. These dextrins or starches may be used alone or in various combinations with each other, the particular proportions of the ingredients when used in combination not being critical.

A good grade of dextrin is very effective in slowing down the setting rate of Portland cement mixed with water to form a grout, appreciable effects being obtained with as little as 0.02% of dextrin by weight based on the weight of the dry cement. For ordinary purposes, I prefer to employ about 0.1% of dextrin or starch when this is used alone as a retarding agent, although the best proportion to use will depend to some extent on the composition of the particular Portland cement to which it is added, and upon the fineness of this cement, as well as upon the amount of retarding effect that is needed.

Dextrin, employed alone as a retarding agent for Portland cement has a tendency to cause the cement to settle out from a water slurry of the cement. Unless the cement employed is extremely fine or only a very small proportion of dextrin is added, therefore, I prefer to employ a mixture of dextrin with starch or a suitable starch containing flour. The mixture of these other materials with dextrin provides a retarding agent that has the desired retarding effect on the setting rate of the Portland cement to a marked degree and that does not hasten the settling out of the cement or substantially impair the ultimate strength of the hardened cement.

The various flours that may be used in conjunction with dextrin include the grain flours such as wheat, corn and rye flour, and also other vegetable flours including potato, soybean, peanut flour and the like. Any of the starch containing flours in general may be used for this purpose. Considerable variation in the proportions of dextrin and flour are possible with different cements.

I have found that a particularly satisfactory setting rate retarder for high grade Portland cements consists of 0.1% by weight of a mixture of equal parts dextrin and flour, or in other words, 0.05% of dextrin and 0.05% of flour. Such a small amount of retarding agent has a negligible effect on the ultimate strength of the cement, but permits the grout of the cement to be pumped easily into the desired location in a deep oil well without any separation of the cement from the water that might leave objectionable voids in the cemented area after the cement has hardened.

In order to illustrate the effectiveness of the retarding agents of this invention on the rate of setting of Portland cements, pumpability tests have been made with various commercial Portland cements, using a special apparatus known as the Halliburton "consistometer" to determine the rate of setting of the cement at elevated temperatures. This apparatus is designed to simulate pumping conditions in an oil well at elevated temperatures and is described in U. S. Patent No. 2,122,765. It consists essentially of a rotating cylindrical container, with an internal paddle assembly fixed to a head whose movement is independent of the container. With the container filled with cement slurry, the thrust against the paddle due to rotation of the container and the viscosity of the slurry is transferred from the head of the apparatus to a pendulum lever arm by a suitable connection. The pendulum range is graduated from 0 to 10 divisions, representing slurry viscosities of approximately 0–10,000 centipoises. A pull of 10 divisions on the pendulum is considered to represent the limit of pumpability for the slurry in an oil well. The temperature of the slurry during test is maintained at a constant high degree by a thermostatically controlled bath surrounding the container.

The following table indicates the effect of the retarding agents of my invention on the rate of setting and strength of two Portland cements of commercial manufacture, as determined by pumpability tests made in the Halliburton "consistometer" at a temperature of 170° F. The column designated "Pumpability" is the time in minutes required for the viscosity of the paste to reach a pull of 10 divisions in the "consistometer." Strengths were determined by curing 2" cubes for 1 day, 3 days and 7 days at a temperature of 170° F.

TABLE I

*Effect of retarders on properties of cement slurry (40% water—all tests at 170° F.)*

PUMPABILITY

| Retarder | Cement "A" | Cement "B" |
|---|---|---|
| | Minutes | Minutes |
| None | 127 | 100 |
| .10% arrowroot starch | 336 | 236 |
| .05% dextrin | 276 | 171 |
| .05% dextrin; .05% flour [1] | 303 | 174 |

COMPRESSIVE STRENGTH

| | Cement "A" | | | Cement "B" | | |
|---|---|---|---|---|---|---|
| | 1 day | 3 days | 7 days | 1 day | 3 days | 7 days |
| None | 6,475 | 8,288 | 8,812 | 6,925 | 8,425 | 8,988 |
| .10% arrowroot starch | 2,575 | 8,150 | 8,800 | 5,062 | 8,625 | 9,212 |
| .05% dextrin | 5,275 | 8,060 | 8,912 | 7,550 | 10,060 | 10,150 |
| .05% dextrin; .05% flour [1] | 5,825 | 8,000 | 8,150 | 7,525 | 9,425 | 10,275 |

[1] Standard brand of wheat flour.

The dextrin used in the foregoing tests was a yellow technical form of corn dextrin purchased on the market. These tests indicate the normal high ultimate strength of cements to which retarders have been added according to this invention, even though the early strength in the case of a starch addition is lowered somewhat.

The cements tested had the following composition:

| | Cement "A" | Cement "B" |
|---|---|---|
| $SiO_2$ | 22.04 | 22.09 |
| $Al_2O_3$ | 3.50 | 4.96 |
| $Fe_2O_3$ | 6.70 | 4.51 |
| $CaO$ | 64.90 | 65.18 |
| $MgO$ | 1.00 | 0.62 |
| $SO_3$ | 1.46 | 1.64 |
| Loss | 0.26 | 0.52 |
| Total | 99.86 | 99.52 |
| Free lime | .00 | 0.96 |
| Calculated $C_3A$ | 0.0 | 5.5 |
| Range of $C_3A$ | .0 | 0.6 |
| Calculated $C_3F$ | 2.6 | 0 |
| Range of $C_3F$ | 0–4 | 0 |
| Fineness (square cm. per gram of cement) | 1,820 | 1,800 |

In general, the proportion of retarding agent employed according to this invention should be about 0.02 to about 0.5% by weight of the dry cement. More than 0.5% of the retarding agent serves no useful purpose and is uneconomical. Also, if too much retarding agent is employed, the setting rate may be actually increased and the ultimate strength of the hardened cement will be effected. An appreciable retarding effect is obtained with amounts of dextrin or a starch, or both, as low as 0.02% and, for most practical purposes, it will be unnecessary to use more than 0.25% of these materials as retarding agents.

The retarding agent or agents may be mixed in a dry form with the cement at any stage in its manufacture, such as during the grinding thereof or after it has been completely ground. If a dextrin is to be used as the retarding agent, starch may be ground with the cement at a temperature of around 200° C. to convert this starch to dextrin simultaneously with the grinding of the cement. Instead of mixing the retarding agent with dry cement, the retarding agent or agents may be added to the mixing water used in preparing the grout, or may be added to the grout shortly after it has been mixed.

I claim:

1. A method of preparing Portland cement to retard the setting rate thereof at elevated temperatures comprising distributing throughout the dry cement about 0.1% of a mixture of dextrin and wheat flour.

2. A method of preparing Portland cement to retard the setting rate thereof at elevated temperatures which comprises distributing throughout the dry cement amounts of dextrin up to about 0.1%.

3. Portland cement containing, as an agent to retard the setting rate of said cement at elevated temperatures, dextrin in amounts up to about 0.1%.

4. Portland cement containing, as an agent to retard the setting rate of said cement at elevated temperatures, a water-soluble carbohydrate selected from the group which consists of dextrin and starches in amounts up to about 0.1%.

5. A method of preparing Portland cement to retard the setting rate thereof at elevated temperatures which comprises distributing throughout the dry cement a water-soluble carbohydrate selected from the group consisting of dextrin and starches in amounts up to about 0.1%.

6. Portland cement containing, as an agent to retard the setting rate of said cement at elevated temperatures, a starch in amounts up to about 0.1%.

7. A method of preparing Portland cement to retard the setting rate thereof at elevated temperatures which comprises distributing throughout the dry cement amounts of a starch up to about 0.1%.

MYRON A. SWAYZE.